US012632205B2

(12) United States Patent
Wang

(10) Patent No.: US 12,632,205 B2
(45) Date of Patent: May 19, 2026

(54) METHOD AND APPARATUS FOR DRIVING SPLICED DISPLAY, SERVER, AND STORAGE MEDIUM

(71) Applicants:HUIZHOU CHINA STAR OPTOELECTRONICS DISPLAY CO., LTD., Huizhou (CN); TCL CHINA STAR OPTOELECTRONICS TECHNOLOGY CO., LTD., Huizhou (CN)

(72) Inventor: Qian Wang, Huizhou (CN)

(73) Assignees: HUIZHOU CHINA STAR OPTOELECTRONICS DISPLAY CO., LTD., Huizhou (CN); TCL CHINA STAR OPTOELECTRONICS TECHNOLOGY CO., LTD., Shenzhen (CN)

( * ) Notice: Subject to any disclaimer, the term of this patent is extended or adjusted under 35 U.S.C. 154(b) by 749 days.

(21) Appl. No.: 17/622,844

(22) PCT Filed: Dec. 22, 2021

(86) PCT No.: PCT/CN2021/140622
§ 371 (c)(1),
(2) Date: Jun. 22, 2023

(87) PCT Pub. No.: WO2023/108777
PCT Pub. Date: Jun. 22, 2023

(65) Prior Publication Data
US 2024/0036798 A1     Feb. 1, 2024

(30) Foreign Application Priority Data

Dec. 13, 2021     (CN) .......................... 202111521902.6

(51) Int. Cl.
*G06F 3/14*     (2006.01)
*G06T 7/11*     (2017.01)
(Continued)

(52) U.S. Cl.
CPC .............. *G06F 3/1446* (2013.01); *G06T 7/11* (2017.01); *G09G 3/32* (2013.01); *G09G 3/36* (2013.01)

(58) Field of Classification Search
CPC ........... G09G 5/005; G09G 3/32; G09G 3/20; G09G 3/36; G09G 2300/026;
(Continued)

(56) References Cited

U.S. PATENT DOCUMENTS

| | | | |
|---|---|---|---|
| 7,006,094 B2 | 2/2006 | Kejser et al. | |
| 2017/0249119 A1* | 8/2017 | Ding ........................ | G09F 9/33 |
| 2020/0272399 A1 | 8/2020 | Liu et al. | |

FOREIGN PATENT DOCUMENTS

| | | |
|---|---|---|
| CN | 1776468 A | 5/2006 |
| CN | 1776475 A | 5/2006 |

(Continued)

OTHER PUBLICATIONS

International Search Report in International application No. PCT/CN2021/140622,mailed on Sep. 20, 2022.
(Continued)

*Primary Examiner* — Yaron Cohen
(74) *Attorney, Agent, or Firm* — PV IP PC; Peter Stecher; Wei Te Chung

(57) ABSTRACT

A method and apparatus for driving a tiled display, a server, and a storage medium are provided. The spliced display comprises a first sub-display screen and a second sub-display screen, wherein a filling screen is arranged between the first sub-display screen and the second sub-display screen. By the method, the pictures on the sub-display (Continued)

screens are displayed on the filling screen, and images do not need to be spliced after being displayed on the filling screen and the sub-display screens, so as to improve the accuracy of the images at the filling screen and avoid image dislocation.

20 Claims, 3 Drawing Sheets

(51) Int. Cl.
    *G09G 3/32*         (2016.01)
    *G09G 3/36*         (2006.01)

(58) Field of Classification Search
    CPC ... G09G 2340/0442; G09G 2320/0233; G09G 2340/04; G09G 2340/14; G06T 7/11; G06F 3/1446
    See application file for complete search history.

(56)           References Cited

FOREIGN PATENT DOCUMENTS

| CN | 102368368 | A | 3/2012 |
|----|-----------|---|--------|
| CN | 105869113 | A | 8/2016 |
| CN | 109257583 | A | 1/2019 |
| CN | 111261050 | A | 6/2020 |
| CN | 111522146 | A | 8/2020 |
| CN | 112700753 | A | 4/2021 |

OTHER PUBLICATIONS

Written Opinion of the International Search Authority in International application No. PCT/CN2021/140622,mailed on Sep. 20, 2022.

Chinese Office Action issued in corresponding Chinese Patent Application No. 202111521902.6 dated Apr. 29, 2023, pp. 1-6.

\* cited by examiner

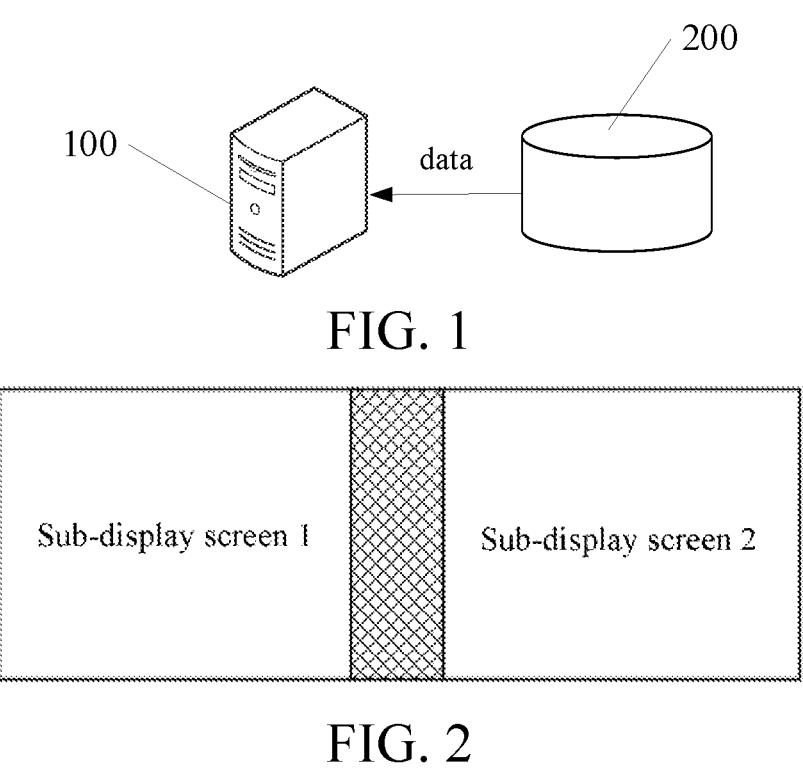

FIG. 1

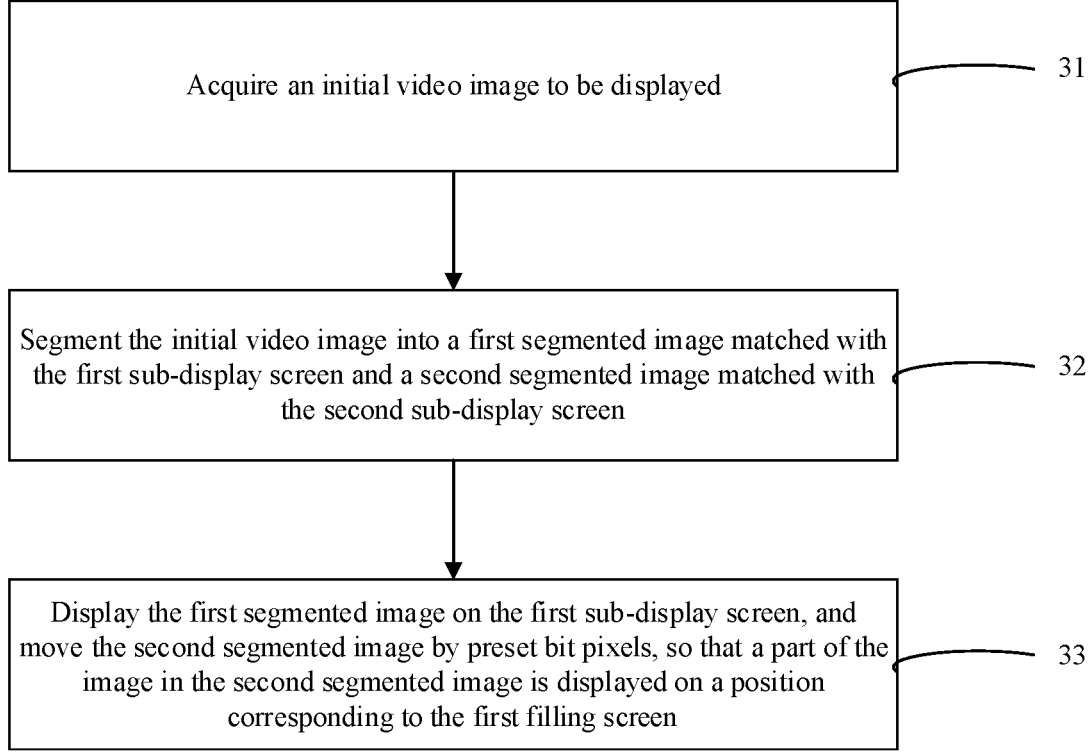

FIG. 2

Acquire an initial video image to be displayed ___ 31

Segment the initial video image into a first segmented image matched with the first sub-display screen and a second segmented image matched with the second sub-display screen ___ 32

Display the first segmented image on the first sub-display screen, and move the second segmented image by preset bit pixels, so that a part of the image in the second segmented image is displayed on a position corresponding to the first filling screen ___ 33

FIG. 3

METHOD AND APPARATUS FOR DRIVING SPLICED DISPLAY, SERVER, AND STORAGE MEDIUM

FIELD OF INVENTION

The present disclosure relates to the field of displaying of spliced displays, in particular to a method and apparatus for driving a spliced display, a server, and a storage medium.

BACKGROUND OF INVENTION

In recent years, a spliced display has been widely used. The spliced display generally includes a plurality of display screens, wherein different display screens display different pictures; and after pictures displayed on a plurality of display screens are spliced, a completed image can be formed.

SUMMARY OF INVENTION

Technical Problem

A spliced display consists of a plurality of different display screens and pictures displayed on all the display screens are different, which results in blurring, dislocation, and the like of the edge part of each spliced display, especially the picture corresponding to the part connected with other spliced displays, affecting the displaying of images.

Technical Solution

The present disclosure aims to provide a method and apparatus for driving a spliced display, a server, and a storage medium, and aims to solve the problem of blurring and dislocation of pictures of the spliced display in the prior art.

In a first aspect, the embodiment of the present disclosure provides the method for driving a spliced display, wherein the spliced display includes at least two sub-display screens, the at least two sub-display screens include a first sub-display screen and a second sub-display screen, and a first filling screen is arranged between the first sub-display screen and the second sub-display screen.

The method for driving a spliced display includes steps of:

acquiring an initial video image to be displayed;

segmenting the initial video image into a first segmented image matched with the first sub-display screen and a second segmented image matched with the second sub-display screen; and displaying the first segmented image on the first sub-display screen, and moving the second segmented image by preset bit pixels, so that a part of the image in the second segmented image is displayed on a position corresponding to the first filling screen.

In the method for driving a spliced display provided in the present embodiment, the spliced display includes the at least two sub-display screens, wherein the at least two sub-display screens include the first sub-display screen and the second sub-display screen, and the filling screen is arranged between the first sub-display screen and the second sub-display screen. The method includes steps of: segmenting the initial video image to obtain the first segmented image corresponding to the first sub-display screen, and the second segmented image corresponding to the second sub-display screen; and moving the second segmented image by preset bit pixels, so that a part of the image in the second segmented image is displayed on a position corresponding to the first filling screen, the pictures on the sub-display screens can be directly displayed on the filling screen, and the images do not need to be spliced after being displayed on the filling screen and the sub-display screens, thereby effectively improving the accuracy of the image at the filling screen and solving the problem of image dislocation and the like.

In one possible embodiment, segmenting the initial video image into the first segmented image matched with the first sub-display screen and the second segmented image matched with the second sub-display screen includes steps of:

determining a first size corresponding to the first sub-display screen and a second size corresponding to the second sub-display screen; and segmenting the initial video image according to the first size and the second size to obtain the first segmented image and the second segmented image.

In the present embodiment, the initial video image is segmented into segmented images corresponding to the sizes of different sub-display screens according to the sizes of the different sub-display screens so as to display the respective segmented images in the different sub-display screens.

In one possible embodiment, displaying the first segmented image on the first sub-display screen, and moving the second segmented image by preset bit pixels, so that a part of the image in the second segmented image is displayed on a position corresponding to the first filling screen, include steps of:

displaying the first segmented image on the first sub-display screen; and determining the size corresponding to the first filling screen so as to move the second segmented image by pixels corresponding to the size of the first filling screen, so that a part of the image in the second segmented image is displayed on the first filling screen.

In the present embodiment, a part of the segmented image can be displayed on the filling screen which does not display pictures originally by moving the segmented image.

In one possible embodiment, the number of the at least two sub-display screens is greater than two. The method further includes step of:

segmenting the initial video image into a plurality of different segmented images according to the size of the plurality of sub-display screens.

The present embodiment defines the case when the number of the sub-display screens is greater than two, at this time, the initial video image is still segmented into a plurality of different segmented images according to the size of the plurality of sub-display screens.

In one possible embodiment, the spliced display further includes a third sub-display screen and a fourth display screen, wherein the third sub-display screen and a fourth sub-display screen are arranged on the same side of the first sub-display screen; and a second filling screen is arranged between the third sub-display screen and the fourth sub-display screen, a third filling screen is arranged between the first sub-display screen and the third sub-display screen, and a fourth filling screen is arranged between the second sub-display screen and the fourth sub-display screen.

Segmenting the initial video image into the first segmented image matched with the first sub-display screen and the second segmented image matched with the second sub-display screen includes steps of:

respectively determining the first size corresponding to the first sub-display screen, the second size corresponding to the second sub-display screen, a third size corresponding to the third sub-display screen and a fourth size corresponding to the fourth sub-display screen; and segmenting the initial video image according to the first size, the second size, the third size and the fourth size to obtain the first segmented image corresponding to the first sub-display screen, the second segmented image corresponding to the second sub-display screen, a third segmented image corresponding to the third sub-display screen and a fourth segmented image corresponding to the fourth sub-display screen.

In the above embodiments, the embodiment in which a spliced screen includes the first sub-display screen, the second sub-display screen, the third sub-display screen and the fourth sub-display screen is provided. But in this embodiment, the initial video image is divided to obtain the first segmented image, the second segmented image, the third segmented image and the fourth segmented image corresponding to different sub-display screens according to the sizes corresponding to different sub-display screens respectively, so as to drive the different sub-display screens by different segmented images.

In one possible embodiment, displaying the first segmented image on the first sub-display screen, and moving the second segmented image by preset bit pixels, so that a part of the image in the second segmented image is displayed on a position corresponding to the first filling screen, include steps of:

displaying the first segmented image on the first sub-display screen;

determining the size corresponding to the first filling screen so as to move the second segmented image by pixels corresponding to the size of the first filling screen, so that a part of the image in the second segmented image is displayed on the first filling screen; and determining the size corresponding to the second filling screen so as to move the third segmented image by pixels corresponding to the size of the third filling screen, so that a part of the image in the third segmented image is displayed on the third filling screen.

In the present embodiment, because there are a plurality of filling screens, it is necessary to move not only the second segmented image to enable the first filling screen to display the picture, but also the third segmented image to enable the third filling screen to display the picture.

In one possible embodiment, displaying the first segmented image on the first sub-display screen, and moving the second segmented image by preset bit pixels, so that a part of the image in the second segmented image is displayed on a position corresponding to the first filling screen, further include steps of:

determining the size corresponding to the fourth filling screen so as to move the fourth segmented image by pixels corresponding to the size of the fourth filling screen in a first direction, so that a part of the image in the fourth segmented image is displayed on the fourth filling screen; and moving the fourth segmented image by pixels corresponding to the size of the second filling screen in a second direction, so that a part of the image in the fourth segmented image is displayed on the second filling screen.

In the present embodiment, on the basis of moving the first segmented image and the third segmented image, it is necessary to further move the fourth segmented image; and it is necessary to move the fourth segmented image twice, so that the fourth segmented image can be displayed on the second filling screen and the fourth filling screen at the same time.

In one possible embodiment, the method further includes steps of:

determining a black area where no image is displayed in the second sub-display screen; and processing the initial video image to obtain a newly added video image corresponding to the black area so as to display the newly added video image in the black area.

In the present embodiment, because the segmented images corresponding to the sub-display screens are moved, the sub-display screens have the black area where no image is displayed; and therefore, it is also necessary to determine the newly added video image corresponding to the black area to drive the black area with the newly added video image, and avoid the situation that the picture is not displayed in the black area to affect picture displaying of the whole spliced screen.

In one possible embodiment, the first sub-display screen and the second sub-display screen are light-emitting diodes (LEDs) and the filling screens are liquid crystal displays (LCDs).

The present embodiment provides the specific embodiment where the first sub-display screen and the second sub-display screen are LEDs, and the filling screens are LCDs.

In a second aspect, the embodiment of the present disclosure provides the apparatus for driving a spliced display, wherein the spliced display includes at least two sub-display screens, the at least two sub-display screens include a first sub-display screen and a second sub-display screen, and a first filling screen is arranged between the first sub-display screen and the second sub-display screen.

The apparatus for driving a spliced display includes:

an acquiring module, configured to acquire an initial video image to be displayed;

a segmenting module, configured to segment the initial video image into the first segmented image matched with the first sub-display screen and the second segmented image matched with the second sub-display screen; and a shifting module, configured to display the first segmented image on the first sub-display screen, and move the second segmented image by preset bit pixels, so that a part of the image in the second segmented image is displayed on a position corresponding to the first filling screen.

In one possible embodiment, the segmenting module is configured to determine the first size corresponding to the first sub-display screen and the second size corresponding to the second sub-display screen; and segment the initial video image according to the first size and the second size to obtain the first segmented image and the second segmented image.

In the present embodiment, the initial video image is segmented into segmented images corresponding to the sizes of different sub-display screens according to the sizes of the different sub-display screens so as to display the respective segmented images in the different sub-display screens.

In one possible embodiment, the shifting module is configured to display the first segmented image on the first sub-display screen; and determine the size corresponding to the first filling screen so as to move the second segmented image by pixels corresponding to the size of the first filling screen, so that a part of the image in the second segmented image is displayed on the first filling screen.

In the present embodiment, a part of the segmented image can be displayed on the filling screen which does not display pictures originally by moving the segmented image.

In one possible embodiment, the number of the at least two sub-display screens is greater than two, and the segmenting module is configured to segment the initial video image into a plurality of different segmented images according to the size of the plurality of sub-display screens.

The present embodiment defines the case when the number of the sub-display screens is greater than two, at this time, the initial video image is still segmented into a plurality of different segmented images according to the size of the plurality of sub-display screens.

In one possible embodiment, the spliced display further includes the third sub-display screen and the fourth display screen, wherein the third sub-display screen and the fourth sub-display screen are arranged on the same side of the first sub-display screen; and the second filling screen is arranged between the third sub-display screen and the fourth sub-display screen, the third filling screen is arranged between the first sub-display screen and the third sub-display screen, and the fourth filling screen is arranged between the second sub-display screen and the fourth sub-display screen.

The segmenting module is configured to segment the initial video image into the first segmented image matched with the first sub-display screen and the second segmented image matched with the second sub-display screen, including steps of:

respectively determining the first size corresponding to the first sub-display screen, the second size corresponding to the second sub-display screen, the third size corresponding to the third sub-display screen and the fourth size corresponding to the fourth sub-display screen; and segmenting the initial video image according to the first size, the second size, the third size and the fourth size to obtain the first segmented image corresponding to the first sub-display screen, the second segmented image corresponding to the second sub-display screen, the third segmented image corresponding to the third sub-display screen and the fourth segmented image corresponding to the fourth sub-display screen.

In the above embodiments, the embodiment in which a spliced screen includes the first sub-display screen, the second sub-display screen, the third sub-display screen and the fourth sub-display screen is provided. But in this embodiment, the initial video image is divided to obtain the first segmented image, the second segmented image, the third segmented image and the fourth segmented image corresponding to different sub-display screens according to the sizes corresponding to different sub-display screens respectively, so as to drive the different sub-display screens by different segmented images.

In one possible embodiment, the shifting module is configured to display the first segmented image on the first sub-display screen;

determine the size corresponding to the first filling screen so as to move the second segmented image by pixels corresponding to the size of the first filling screen, so that a part of the image in the second segmented image is displayed on the first filling screen; and determine the size corresponding to the second filling screen so as to move the third segmented image by pixels corresponding to the size of the third filling screen, so that a part of the image in the third segmented image is displayed on the third filling screen.

In the present embodiment, because there are the plurality of filling screens, it is necessary to move not only the second segmented image to enable the first filling screen to display the picture, but also the third segmented image to enable the third filling screen to display the picture.

In one possible embodiment, the shifting module is configured to determine the size corresponding to the fourth filling screen so as to move the fourth segmented image by pixels corresponding to the size of the fourth filling screen in a first direction, so that a part of the image in the fourth segmented image is displayed on the fourth filling screen; and move the fourth segmented image by pixels corresponding to the size of the second filling screen in the second direction, so that a part of the image in the fourth segmented image is displayed on the second filling screen.

In the present embodiment, on the basis of moving the first segmented image and the third segmented image, it is necessary to further move the fourth segmented image; and it is necessary to move the fourth segmented image twice, so that the fourth segmented image can be displayed on the second filling screen and the fourth filling screen at the same time.

In one possible embodiment, the first sub-display screen and the second sub-display screen are the LEDs and the filling screens are the LCDs.

The present embodiment provides the specific embodiment where the first sub-display screen and the second sub-display screen are the LEDs, and the filling screens are the LCDs.

In one possible embodiment, the at least two sub-display screens are of the same size.

The present embodiment provides an embodiment where the at least two sub-display screens are of the same size, which is more consistent with a practical spliced display screen arrangement.

In a third aspect, the embodiment of the present disclosure further provides a server. The server includes:

one or more processors;

a memory; and one or more applications, wherein the one or more applications are stored in the memory and configured to be executed by the processors to realize the method for driving a spliced display as any mentioned above.

In a fourth aspect, the embodiment of the present disclosure further provides a computer readable storage medium, and a computer program is stored on the computer readable storage medium, and is loaded by the processors to perform steps of the method for driving a spliced display as any mentioned above.

Beneficial Effects

The present disclosure provides a method and apparatus for driving a spliced display, a server, and a storage medium. The spliced display includes at least two sub-display screens, wherein the at least two sub-display screens include a first sub-display screen and a second sub-display screen, and a first filling screen is arranged between the first sub-display screen and the second sub-display screen. The method includes steps of: segmenting the initial video image to obtain the first segmented image corresponding to the first sub-display screen, and the second segmented image corresponding to the second sub-display screen; and moving the second segmented image by preset bit pixels, so that a part of the image in the second segmented image is displayed on a position corresponding to the first filling screen, the pictures on the sub-display screens can be directly displayed on the filling screen, and the images do not need to be spliced after being displayed on the filling screen and the sub-display screens, thereby effectively improving the accuracy of the image at the filling screen and solving the problem of image dislocation and the like.

BRIEF DESCRIPTION OF DRAWINGS

To describe the technical solutions in the embodiments of the present disclosure more clearly, the following briefly describes accompanying drawings required for describing the embodiments. Apparently, the accompanying drawings in the following descriptions show merely some embodiments of the present disclosure, and a person skilled in the art may still derive other accompanying drawings from these accompanying drawings without creative efforts.

FIG. 1 is a schematic diagram of a scenario of a system for driving a spliced display provided in an embodiment of the present disclosure.

FIG. 2 is a schematic diagram of a structure of an embodiment of the spliced display provided in an embodiment of the present disclosure.

FIG. 3 is a schematic diagram of a flow of one embodiment of a method for driving a spliced display provided in an embodiment of the present disclosure.

DETAILED DESCRIPTION OF PREFERRED EMBODIMENTS

Figure 4:
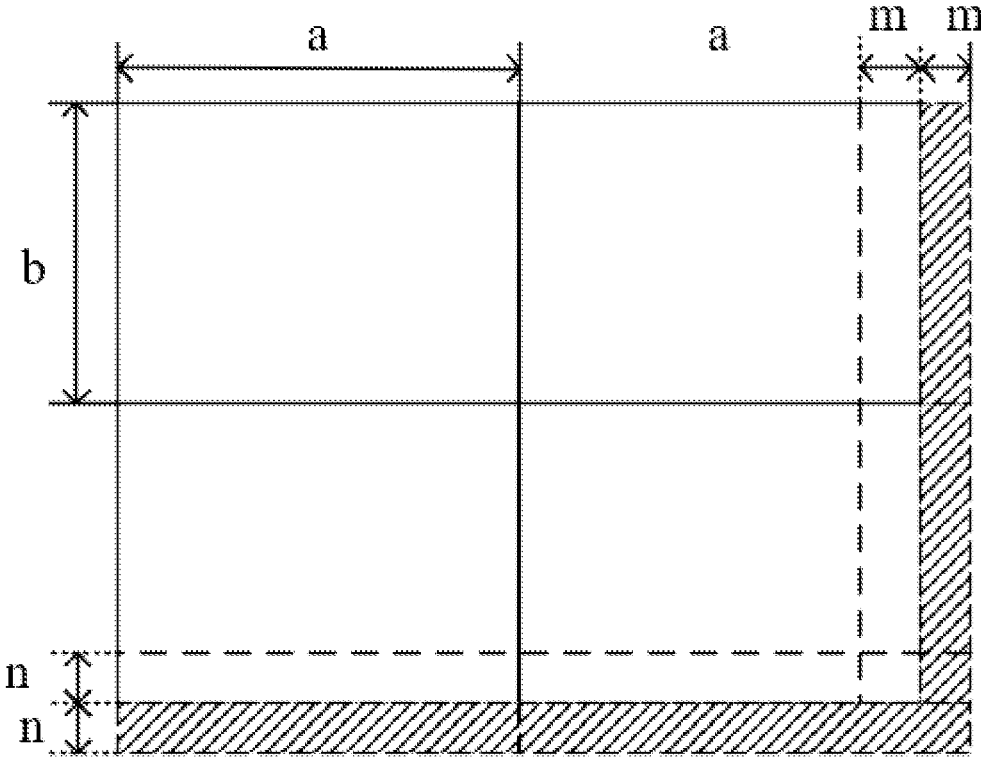
FIG. 4 is a schematic diagram of a structure of another embodiment of a spliced display provided in an embodiment of the present disclosure.

The technical solutions in the embodiments of the present disclosure are clearly and completely described below with reference to the accompanying drawings in the embodiments of the present disclosure. Apparently, the described embodiments are merely some rather than all of the embodiments of the present disclosure. All other embodiments obtained by a person skilled in the art based on the embodiments of the present disclosure without creative efforts shall fall within the protection scope of the present disclosure.

In the description of the present disclosure, it should be understood that orientation or position relationships indicated by the terms such as "center", "longitudinal", "lateral", "length", "width", "thickness", "above", "below", "front", "rear", "left", "right", "vertical", "horizontal", "top", "bottom", "inside", and "outside" are based on orientation or position relationships shown in the accompanying drawings, and are used only for ease and brevity of illustration and description, rather than indicating or implying that the mentioned apparatus or component needs to have a particular orientation or needs to be constructed and operated in a particular orientation. Therefore, such terms should not be construed as limiting of the present disclosure. In addition, the terms "first" and "second" are used for descriptive purposes only and are not to be construed as indicating or implying relative importance or implicitly indicating the number of technical features indicated. Therefore, a feature limited by "first" or "second" may explicitly or implicitly include one or more of the features. In the descriptions of the present disclosure, "a plurality of" means two or more, unless otherwise definitely and specifically limited.

In the present disclosure, the word "exemplary" is used as "as an example, illustration, or description. Any embodiment described as "exemplary" in the present disclosure is not necessarily to be construed as superior or more advantageous than other embodiments. In order to enable those of ordinary skill in the art to make and use the present disclosure, the following description is given. In the following description, details are set forth for purposes of explanation. It should be understood that those of ordinary skill in the art can realize that the present disclosure can also be implemented without these specific details. In other instances, well-known structures and processes have not been described in detail so as not to obscure the description of the present disclosure with unnecessary detail. Thus, the present disclosure is not intended to be limited to the embodiments shown, but is to be consistent with the widest scope that conforms to the principles and features disclosed by the present disclosure.

It should be noted that since the method of the embodiments of the present disclosure is performed in the electronic device, processing objects of each electronic device exist in the form of data or information, such as time, and are substantively time information, it can be understood that if the sizes, numbers, positions and the like are mentioned in the subsequent embodiments, they all exist in the form of corresponding data so as to be processed by the electronic device, and the detailed description thereof will not be provided here.

The embodiments of the present disclosure provide a method and apparatus for driving a spliced display, a server, and a storage medium, which are respectively described in detail below.

Referring to FIG. 1, FIG. 1 is a schematic diagram of a scenario of a system for driving a spliced display provided in an embodiment of the present disclosure. The system for driving the spliced display may include an electronic device 100, and an apparatus for driving the spliced display is integrated in the electronic device 100, such as the electronic device in FIG. 1.

In embodiments of the present disclosure, the electronic device 100 may be an independent server, or may be a server network or server cluster consisting of servers, for example, the electronic device 100 described in the embodiments of the present disclosure includes but is not limited to a computer, a network host, a single network server, a plurality of network server sets or a cloud server consisting of a plurality of servers. Here, the cloud server consists of a large number of computers or network servers based on cloud computing (Cloud Computing).

Those of ordinary skill in the art should understand that the application environment shown in FIG. 1 is merely one application scenario of the solution of the present disclosure, and does not limit the application scenario of the solution of the present disclosure; other application environments may also include more or less electronic devices than those shown in FIG. 1, for example, only one electronic device is shown in FIG. 1; and it can be understood that the system for driving the spliced display may also include one or more other servers, which are not specifically defined herein.

In addition, as shown in FIG. 1, the system for driving the spliced display may further include a memory 200 for storing data.

It should be noted that the schematic diagram of the scenario of the system for driving the spliced display shown as FIG. 1 is merely an example, and the system for driving the spliced display and the scenario described in the embodiment of the present disclosure are used for more clearly describing the technical solution of the embodiment of the present disclosure, and do not limit the technical solution provided in the embodiment of the present disclosure; and those of ordinary skill in the art should know that, with the evolution of the system for driving the spliced display and the appearance of a new service scenario, the technical solution provided in the embodiment of the present disclosure is also applicable to similar technical problems.

Firstly, in the embodiments of the present disclosure, the method for driving a spliced display is provided, an execution main body of the method for driving a spliced display is the apparatus for driving a spliced display, and the apparatus for driving spliced display is applied to the electronic device. The method for driving a spliced display includes steps of: acquiring an initial video image to be displayed; segmenting the initial video image into a first segmented image matched with a first sub-display screen and a second segmented image matched with a second sub-display screen; displaying the first segmented image on the first sub-display screen, and moving the second segmented image by preset bit pixels, so that a part of the image in the second segmented image is displayed on a position corresponding to a first filling screen.

FIG. 2 is a schematic diagram of a structure of an embodiment of the spliced display provided in an embodiment of the present disclosure. In the spliced display shown as FIG. 2, the spliced display may include at least two sub-display screens, wherein the at least two sub-display screens may be the first sub-display screen and the second sub-display screen respectively; and the first filling screen is further arranged between the first sub-display screen and the second sub-display screen, namely, the first sub-display screen and the second sub-display screen are separated by the first filling screen.

Referring to FIG. 3, which is a schematic diagram of a flow of one embodiment of a method for driving a spliced display provided in an embodiment of the present disclosure. As shown in FIG. 3, the method for driving a spliced display includes steps of:

31, acquiring an initial video image to be displayed;

32, segmenting the initial video image into a first segmented image matched with the first sub-display screen and a second segmented image matched with the second sub-display screen, wherein in the embodiments of the present disclosure, firstly, the initial video image to be displayed on the spliced display needs to be acquired; because the initial video image needs to be displayed on at least two sub-display screens, the initial video image is segmented, namely, the initial video image is segmented into the first segmented image matched with the first sub-display screen and the second segmented image matched with the second sub-display screen, that is, generally, the first segmented image is displayed on the first sub-display screen and the second segmented image is displayed on the second sub-display screen; and 33, displaying the first segmented image on the first sub-display screen, and moving the second segmented image by preset bit pixels, so that a part of the image in the second segmented image is displayed on a position corresponding to the first filling screen.

Because the spliced display provided by the embodiment of the present disclosure includes at least two sub-display screens, wherein the first filling screen is further arranged between the at least two sub-display screens, and if a better displayed picture is desired, the picture should also be displayed on the first filling screen.

Therefore, in the embodiment of the present disclosure, the corresponding first segmented image is normally displayed in the first sub-display screen, and the second segmented image is moved, so that a part of the second segmented image is displayed on the first filling screen, and the picture can also be displayed normally on the second filling screen. In this way, the images displayed on the first sub-display screen, the first filling screen and the second sub-display screen can be spliced into a complete frame of images.

In an actual picture display scenario of the spliced display, the size of the first filling screen is usually very small, and the size of the first filling screen is much smaller than that of the sub-display screens, so that only a part of the second segmented image is displayed on the first filling screen.

In other embodiments of the present disclosure, in order to display the second segmented image on the second sub-display screen, the first segmented image can be moved by preset bit pixels, so that a part of the image in the first segmented image is displayed on a position corresponding to the first filling screen.

That is to say, in the embodiments of the present disclosure, mainly the images displayed on the sub-display screens are moved to the filling screen for display, and it is not limited for images displayed on which sub-display screen.

In the method for driving a spliced display provided in the present embodiment of the present disclosure, the spliced display includes the at least two sub-display screens, wherein the at least two sub-display screens include the first sub-display screen and the second sub-display screen, and the filling screen is arranged between the first sub-display screen and the second sub-display screen. The method includes steps of: segmenting the initial video image to obtain the first segmented image corresponding to the first sub-display screen, and the second segmented image corresponding to the second sub-display screen; and moving the second segmented image by preset bit pixels, so that a part of the image in the second segmented image is displayed on a position corresponding to the first filling screen, the pictures on the sub-display screens can be directly displayed on the filling screen, and the images do not need to be spliced after being displayed on the filling screen and the sub-display screens, thereby effectively improving the accuracy of the image at the filling screen and solving the problem of image dislocation and the like.

In the embodiment of the present disclosure, segmenting the initial video image into the first segmented image matched with the first sub-display screen and the second segmented image matched with the second sub-display screen can include steps of:

determining a first size corresponding to the first sub-display screen and a second size corresponding to the second sub-display screen; and segmenting the initial video image according to the first size and the second size to obtain the first segmented image and the second segmented image.

That is, in the embodiments of the present disclosure, actually, the initial video image is respectively segmented into a plurality of different segmented images matched with the sizes of the at least two sub-display screens according to the sizes (or resolutions) of the at least two sub-display screens.

In other embodiments, when the number of the at least two sub-display screens is greater than two, the initial video image is segmented into a plurality of different segmented images according to the sizes of the plurality of sub-display screens.

In an actual picture display scenario of the spliced display, the sizes of the at least two sub-display screens are typically the same, so that the initial video image can be segmented into a plurality of different segmented images of the same size. In a specific embodiment, when the at least two sub-display screens include the first sub-display screen and the second sub-display screen, the sizes of the first sub-display screen and the second sub-display screen are the same; at this time, the initial video image is segmented into the first segmented image matched with the first sub-display screen and the second segmented image matched with the second sub-display screen, and actually, the initial video image is segmented equally to obtain the first segmented image and the second segmented image, wherein the sizes of the first segmented image and the second segmented image are the same.

In the embodiments of the present disclosure, it is required that a part of image displayed on the sub-display screens is displayed on the first filling screen. At this time, displaying the first segmented image on the first sub-display screen, and moving the second segmented image by preset bit pixels, so that a part of the image in the second segmented image is displayed on a position corresponding to the first filling screen may include steps of:

displaying the first segmented image on the first sub-display screen; and determine the size corresponding to the first filling screen so as to move the second segmented image by pixels corresponding to the size of the first filling screen, so that a part of the image in the second segmented image is displayed on the first filling screen.

Referring to FIG. 2, in FIG. 2, the first sub-display screen 1 and the second sub-display screen 2 can be light emitting diode (LED) display screens, and the filling screen may be a liquid crystal display (LCD). The first filling screen is arranged between the first sub-display screen 1 and the second sub-display screen 2. In the embodiment of the present disclosure, the images also need to be displayed on the filling screens, specifically the image displayed on the first sub-display screen 1 or the second sub-display screen 2 is moved to the first filling screen for display.

Under normal circumstances, the image needs to be displayed on the entire first filling screen, so as to ensure that no black area without the image appears at the junction of the first sub-display screen 1 and the first filling screen; and no black area without the image appears at the junction of the second sub-display screen 2 and the first filling screen.

Therefore, the size of the first filling screen needs to be determined so as to move the second segmented image by pixels corresponding to the size of the first filling screen, so that the second segmented image can completely cover the first filling screen, and the situation that no black area without image appears in the segmented image can be guaranteed. In other embodiments, the first segmented image may also be moved by pixels corresponding to the size of the first filling screen, so that the first segmented image can completely cover the first filling screen and the situation that no black area without image appears in the segmented image can be guaranteed.

Referring to FIG. 2, with regard to FIG. 2, the first sub-display screen and the second sub-display screen may be light emitting diode (LED) display screens, and the spliced screen may be a liquid crystal display (LCD).

If the first segmented image is moved, the first segmented image is moved to the right by preset bit pixels; and if the second segmented image is moved, the second segmented image is moved to the left by the preset bit pixels. Whether to move the first segmented image or the second segmented image, the moved image needs to completely cover the first filling screen.

As shown in FIG. 4, the schematic diagram of a structure of another embodiment of the spliced display is provided in the embodiment of the present disclosure. In the spliced display shown in FIG. 4, the spliced display further includes the third sub-display screen 3 and the fourth sub-display screen 4 in addition to the first sub-display screen 1 and the second sub-display screen 2, and the third sub-display screen 3 and the fourth sub-display screen 4 are arranged on the same side of the first sub-display screen 1. As shown in FIG. 4, the second filling screen is arranged between the third sub-display screen 3 and the fourth sub-display screen, the third filling screen is arranged between the first sub-display screen 1 and the third sub-display screen 3, and the fourth filling screen is arranged between the second sub-display screen 2 and the fourth sub-display screen 4.

At this time, the pictures need to be displayed on the first sub-display screen 1, the second sub-display screen 2, the third sub-display screen 3 and the fourth sub-display screen, and are displayed on the first filling screen, the second filling screen, the third filling screen and the fourth filling screen.

In the embodiment shown in FIG. 4, segmenting the initial video image into the first segmented image matched with the first sub-display screen and the second segmented image matched with the second sub-display screen can include steps of:

respectively determining the first size corresponding to the first sub-display screen, the second size corresponding to the second sub-display screen, the third size corresponding to the third sub-display screen and the fourth size corresponding to the fourth sub-display screen; and segmenting the initial video image according to the first size, the second size, the third size and the fourth size to obtain the first segmented image corresponding to the first sub-display screen, the second segmented image corresponding to the second sub-display screen, the third segmented image corresponding to the third sub-display screen and the fourth segmented image corresponding to the fourth sub-display screen.

That is to say, because the spliced display in FIG. 4 includes four sub-display screens, four segmented images should be obtained by segmenting the initial video image at this moment; and the number of the segmented images is same as that of the sub-display screens. Similarly, the initial video image is segmented according to the sizes of the four sub-display screens to obtain four segmented images; and one sub-display screen corresponds to one segmented image.

In the picture display scenario of an actual spliced display, the sizes of the sub-display screens are usually the same regardless of the number of the sub-display screens. Therefore, regardless of the number of the sub-display screens, segmenting of an initial video signal is usually performed equally according to the number of the sub-display screens. For example, if the number of the sub-display screens is four, the four sub-display screens are arranged in an array as shown in FIG. 4; and then the initial video signal is equally divided into four parts, to obtain four segmented images.

Of course, in other embodiments, if the sizes of the sub-display screens are different, the resolutions of the plurality of segmented images obtained by segmenting the initial video signal are also different. The resolutions of the segmented images are matched with the sizes of the sub-display screens.

At this time, displaying the first segmented image on the first sub-display screen, and moving the second segmented image by preset bit pixels, so that a part of the image in the second segmented image is displayed on a position corresponding to the first filling screen may include steps of:

displaying the first segmented image on the first sub-display screen; determining the size corresponding to the first filling screen so as to move the second segmented image by pixels corresponding to the size of the first filling screen, so that a part of the image in the second segmented image is displayed on the first filling screen; determining the size corresponding to the second filling screen so as to move the third segmented image by pixels corresponding to the size of the third filling screen, so that a part of the image in the third segmented image is displayed on the third filling screen;

determining the size corresponding to the fourth filling screen so as to move the fourth segmented image by pixels corresponding to the size of the fourth filling screen in a first direction, so that a part of the image in the fourth segmented image is displayed on the fourth filling screen; and moving the fourth segmented image by pixels corresponding to the size of the second filling screen in the second direction, so that a part of the image in the fourth segmented image is displayed on the second filling screen.

Specifically, referring to FIG. 4, the first sub-display screen 1 still displays the first segmented image normally; but the second segmented image corresponding to the second sub-display screen 2 needs to be moved by pixels corresponding to the size of the first filling screen, so that a part of the image in the second segmented image is displayed on the first filling screen.

At the same time, the size corresponding to the second filling screen is determined, and the third segmented image corresponding to the third sub-display screen 3 is moved by the pixels corresponding to the size of the second filling screen. However, with regard to the fourth segmented image corresponding to the fourth sub-display screen, the fourth segmented image not only needs to be moved by pixels corresponding to the size of the fourth filling screen, but also needs to be moved by pixels corresponding to the size of the second filling screen. That is, the fourth segmented image needs to be displayed not only on the second filling screen but also on the fourth filling screen.

With regard to FIG. 4, the first segmented image is normally displayed on the first sub-display screen 1; the second segmented image corresponding to the second sub-display screen 2 can be moved to the left; the third segmented image corresponding to the third sub-display screen 3 can be moved upwards; however, with regard to the fourth sub-display screen 4, the fourth segmented image not only needs to be moved upwards but also needs to be moved to the left, so as to ensure that the whole spliced display displays a complete frame of picture.

In the embodiment, the plurality of segmented images are integrally moved to the upper left; and in other embodiments, the plurality of segmented images may also be integrally moved to the upper right. Specifically, the second sub-display screen 2 normally displays the second segmented image, while the first segmented image is moved to the right by pixels corresponding to the size of the first filling screen, and the fourth segmented image is moved upwards by the pixels corresponding to the size of the fourth filling screen.

However, with regard to the third segmented image, the third segmented image not only needs to be moved upwards by the pixels corresponding to the size of the fourth filling screen, but also needs to be moved to the right by the pixels corresponding to the size of the second filling screen.

Similarly, in other embodiments of the present disclosure, the segmented image can also be integrally moved to the lower left, or the segmented image is integrally moved to the lower right, or the segmented image is integrally moved towards the center of a center spliced display. In the embodiment of the present disclosure, mainly a signal missing part corresponding to the filling screen is moved to an inconspicuous place such as an edge; and usually, due to the small size of the filling screen, human eyes do not easily perceive even if the signal missing part is moved to the edge.

In a specific embodiment, the resolution of the initial video signal is 2a*2b; the original video signal is segmented into four segmented images of a*b, and one sub-display screen corresponds to one segmented image of a*b respectively. After the segmented images corresponding to the sub-display screens are moved, a complete picture can be displayed on the whole spliced display, and pictures are also normally displayed on the filling screens.

In the embodiment, the segmented images are moved so that the filling screens can display the segmented images; and in the edge of the spliced display, a black area where no image is displayed appears, and it is necessary to supplement the black area, so that the black area also displays an image.

Specifically, a supplementing process may include steps of: determining the black area where no image is displayed in the second sub-display screen; processing the initial video signal to obtain a newly added video image corresponding to the black area, so as to display the newly added video image in the black area.

Specifically, in the embodiment of the present disclosure, the pictures normally displayed on the sub-display screens are moved, so that a part of images normally displayed on the sub-display screens originally are displayed on the filling screens, while there is an area, namely the black area where no image is displayed on the sub-display screens. Generally, the black area where no image is displayed is arranged at the edge of the whole spliced display; and the size corresponding to the black area is same as that corresponding to the filling screens.

However, in the embodiment of the present disclosure, the initial video image needs to be processed so as to determine the newly added video image corresponding to the black area according to the initial video image. In some embodiments, the initial video image may be processed using a preset interpolation method to obtain the newly added video image corresponding to the black area, so as to display the newly added video image in the black area.

Specifically, taking FIG. 4 as an example, the size of the spliced display is 2a*2b, and the resolution of the corresponding initial video signal is also 2a*2b. After the filling screens are set, the sizes corresponding to the four filling screens are respectively m*b and n*(a+m/2); the size of the whole spliced display becomes (2a+m)*(2b+n); and the four filling screens are arranged in the spliced display to separate different sub-display screens.

After the segmented images corresponding to the second sub-display screen 2, the third sub-display screen 3 and the fourth sub-display screen 4 are all moved to the corresponding filling screens for display, black areas without image display will appear on the right edge and the lower edge of the whole spliced display. The size of the whole black area can be: 2m*b+2n*a+m*n.

For the black area with the size of m*2b, an interpolation method is performed to determine the newly added video image corresponding to the black area, and pictures in the second sub-display screen 2 and the fourth sub-display screen 4 connected with the black area can be used for reference. Specifically, pictures within a preset pixel range in the second sub-display screen 2 and the fourth sub-display screen 4 connected with the black area can be used for reference.

As shown in FIG. 4, for the black area with the size of m*2b, dashed parts in the figures can be used for reference. The left side of the dashed parts is a part of the second sub-display screen 2 and the fourth sub-display screen 4, and the right side of the dashed parts is the black area where no image is displayed.

Figure 5:
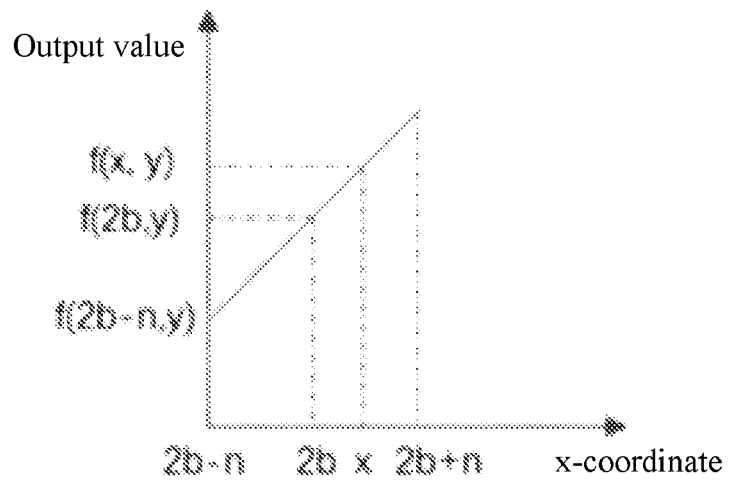
FIG. 5 is a schematic diagram of extrapolation of an x-coordinate provided in an embodiment of the present disclosure.

Specifically, for the black area within the range ($0 \leq x \leq 2b$, $2a-m \leq y \leq 2a+m$) (namely the dashed parts), a pixel value corresponding to each pixel in the black area can be determined using the following formula. The formula is specifically:

$$f(x, y) = f(x, 2a - m) + \frac{(f(x, 2a) - f(x, 2a - m)) \times (y - (2a - m))}{(2a - (2a - m))},$$

$$2a < y \ll 2a + m$$

wherein x and y are coordinates corresponding to pixels, and only one pixel can be determined through one corresponding (x, y). FIG. 5 is a schematic diagram of extrapolation of an x-coordinate provided in an embodiment of the present disclosure. In FIG. 5, the pixel value of a pixel varies as the pixel position varies; and the larger the abscissa X of the pixel is, the larger the pixel value of the pixel is.

However, for a part of the black area located below the spliced display, the same method can be used to determine the newly added video image corresponding to the black area. Specifically, for a black area within the range of ($2b-n \leq x \leq 2b+n$, $0 \leq y \leq 2a+m$), a pixel value corresponding to each pixel in the black area can be determined using the following formula, and the formula is:

$$f(x, y) = f(2b - n, y) + \frac{(f(2b, y) - f(2b - n, y)) \times (x - (2b - n))}{(2b - (2b - n))},$$

$$2b < x \ll 2b + n$$

Figure 6:
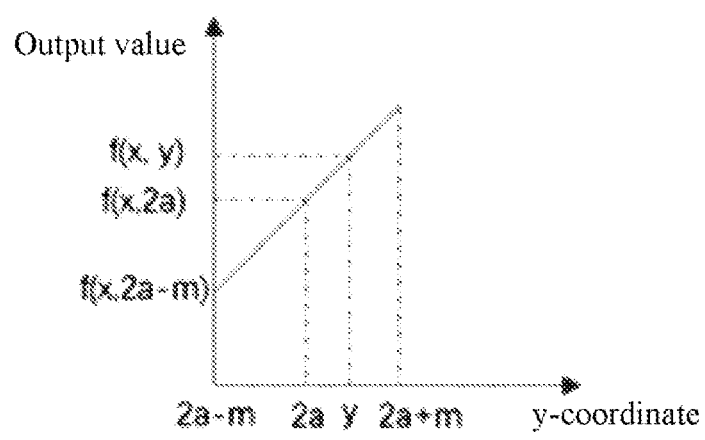
FIG. 6 is a schematic diagram of extrapolation of a Y-coordinate provided in an embodiment of the present disclosure.

FIG. 6 is a schematic diagram of extrapolation of a Y-coordinate provided in an embodiment of the present disclosure, wherein the abscissa represents the Y coordinate value corresponding to the black area, and the larger the Y value of the ordinate of the pixel is, the larger the pixel value corresponding to the pixel is.

Figure 7:
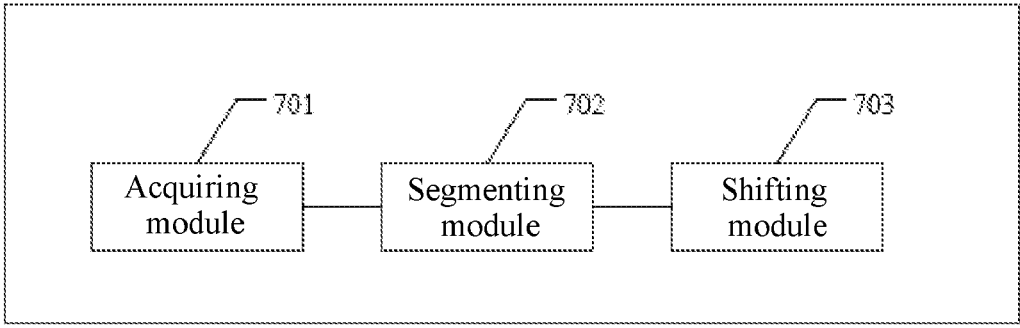
FIG. 7 is a schematic diagram of an embodiment of an apparatus for driving a spliced display provided in an embodiment of the present disclosure.

The embodiment of the present disclosure further provides the apparatus for driving a spliced display, FIG. 7 is a schematic diagram of an embodiment of an apparatus for driving a spliced display provided in an embodiment of the present disclosure, and the device may include:

an acquiring module 701, configured to acquire an initial video image to be displayed, a segmenting module 702, configured to segment the initial video image into a first segmented image matched with the first sub-display screen and a second segmented image matched with the second sub-display screen, and a shifting module 703, configured to display the first segmented image on the first sub-display screen, and moving the second segmented image by preset bit pixels, so that a part of the image in the second segmented image is displayed on a position corresponding to the first filling screen.

In the apparatus for driving a spliced display provided in the present embodiment of the present disclosure, the spliced display includes the at least two sub-display screens, wherein the at least two sub-display screens include the first sub-display screen and the second sub-display screen, and the filling screen is arranged between the first sub-display screen and the second sub-display screen. The apparatus is configured to segment the initial video image to obtain the first segmented image corresponding to the first sub-display screen, and the second segmented image corresponding to the second sub-display screen; and move the second segmented image by preset bit pixels, so that a part of the image in the second segmented image is displayed on a position corresponding to the first filling screen, the pictures on the sub-display screens can be directly displayed on the filling screen, and the images do not need to be spliced after being displayed on the filling screen and the sub-display screens, thereby effectively improving the accuracy of the image at the filling screen and solving the problem of image dislocation and the like.

In some embodiments of the present disclosure, the segmenting module 702 may be further configured to: determine a first size corresponding to the first sub-display screen and a second size corresponding to the second sub-display screen; and segment the initial video image according to the first size and the second size to obtain the first segmented image and the second segmented image.

In some embodiments of the present disclosure, the shifting module 703 may be further configured to: display the first segmented image on the first sub-display screen; and Determine the size corresponding to the first filling screen so as to move the second segmented image by pixels corresponding to the size of the first filling screen, so that a part of the image in the second segmented image is displayed on the first filling screen.

In some embodiments of the present disclosure, the spliced display further includes the third sub-display screen and the fourth display screen, wherein the third sub-display screen and the fourth sub-display screen are arranged on the same side of the first sub-display screen; and the second filling screen is arranged between the third sub-display screen and the fourth sub-display screen, the third filling screen is arranged between the first sub-display screen and the third sub-display screen, and the fourth filling screen is arranged between the second sub-display screen and the fourth sub-display screen. The segmenting module 702 can be specially configured to:

respectively determine the first size corresponding to the first sub-display screen, the second size corresponding to the second sub-display screen, the third size corresponding to the third sub-display screen and the fourth size corresponding to the fourth sub-display screen; and Segment the initial video image according to the first size, the second size, the third size and the fourth size to obtain the first segmented image corresponding to the first sub-display screen, the second segmented image corresponding to the second sub-display screen, the third segmented image corresponding to the third sub-display screen and the fourth segmented image corresponding to the fourth sub-display screen.

In some embodiments of the present disclosure, the shifting module 703 may be further configured to: display the first segmented image on the first sub-display screen; determine the size corresponding to the first filling screen so as to move the second segmented image by pixels corresponding to the size of the first filling screen, so that a part of the image in the second segmented image is displayed on the first filling screen; and determine the size corresponding to the second filling screen so as to move the third segmented image by pixels corresponding to the size of the third filling screen, so that a part of the image in the third segmented image is displayed on the third filling screen.

In some embodiments of the present disclosure, the shifting module 703 may specifically also be configured to: determine the size corresponding to the fourth filling screen so as to move the fourth segmented image by pixels corresponding to the size of the fourth filling screen in a first direction, so that a part of the image in the fourth segmented image is displayed on the fourth filling screen; and move the fourth segmented image by pixels corresponding to the size of the second filling screen in the second direction, so that a part of the image in the fourth segmented image is displayed on the second filling screen.

Figure 8:
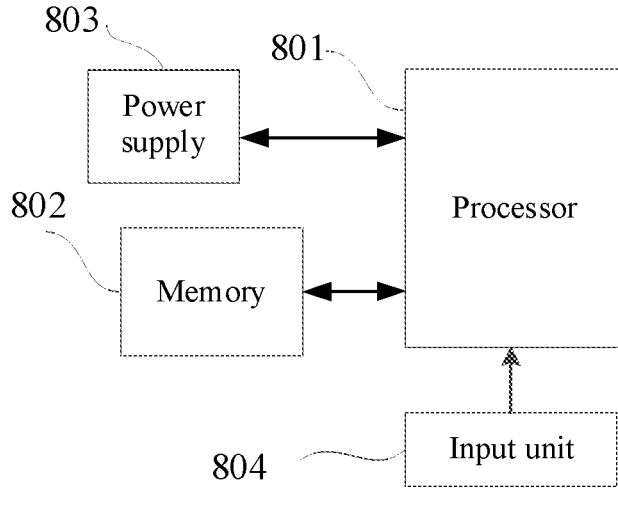
FIG. 8 shows a schematic diagram of a structure of an electronic device according to an embodiment of the present disclosure.

The embodiments of the present disclosure also provide an electronic device that integrates any apparatus for driving a spliced display provided in the embodiments of the present disclosure. FIG. 8 shows a schematic diagram of a structure of an electronic device according to an embodiment of the present disclosure, specifically as below:

The electronic device may include components such as a processor 801 with one or more processing cores, a memory 802 with one or more computer-readable storage media, a power supply 803, and an input unit 804. A person skilled in the art may understand that the electronic device structure shown in the figure does not constitute a limitation to the electronic device. The electronic device may include more or fewer components than those shown in the figure, or some components may be combined, or a different component deployment may be used.

The processor 801 is a control center of the electronic device, and connects various parts of the entire electronic device by using various interfaces and lines. By running or executing a software program and/or a module stored in the memory 802, and invoking data stored in the memory 802, the processor performs various functions of the electronic device and processes data, thereby performing overall monitoring on the electronic device. Optionally, the processor 801 may include one or more processing cores. Preferably, the processor 801 may integrate an application processor and a modem processor. The application processor mainly processes an operating system, a user interface, an application, and the like. The modem processor mainly processes wireless communication. It may be understood that alternatively, the modem processor may not be integrated into the processor 801.

The memory 802 may be configured to store the software programs and modules. The processor 801 runs the software programs and modules stored in the memory 802, to perform various function application and data processing. The memory 802 may mainly include a program storage area and a data storage area. The program storage area may store an operating system, an application program required by at least one function (such as a sound playback function and an image display function), and the like. The data storage area may store data created according to use of the electronic device, and the like. In addition, the memory 802 may include a high speed random access memory, and may alternatively include a non-volatile memory, such as at least one magnetic disk storage device, a flash memory, or another volatile solid-state storage device. Correspondingly, the memory 802 may further include a memory controller, to allow the processor 801 to access the memory 802.

The electronic device further includes the power supply 803 for supplying power to the components. Preferably, the power supply 803 may logically connect to the processor 801 by using a power supply management system, thereby implementing functions, such as charging, discharging, and power consumption management, by using the power supply management system. The power supply 803 may further include one or more of a direct current or alternating current power supply, a re-charging system, a power failure detection circuit, a power supply converter or inverter, a power supply state indicator, and any other component.

The electronic device may further include the input unit 804. The input unit 804 may be configured to receive inputted numeric or character information and generate keyboard, mouse, joystick, optical, or trackball signal input related to user settings and function control.

Although not shown in the figure, the electronic device may further include a display unit, and the like. Details are not described herein again. Specifically, in this embodiment, the processor 801 of the electronic device may load, according to the following instructions, executable files corresponding to processes of one or more application programs into the memory 802. The processor 801 runs the application programs stored in the memory 802, to implement the various functions as follows:

acquiring an initial video image to be displayed; segmenting the initial video image into a first segmented image matched with a first sub-display screen and a second segmented image matched with a second sub-display screen; displaying the first segmented image on the first sub-display screen, and moving the second segmented image by preset bit pixels, so that a part of the image in the second segmented image is displayed on a position corresponding to a first filling screen.

A person of ordinary skill in the art may understand that, all or some steps of the methods in the foregoing embodiments may be implemented by using instructions, or implemented through instructions controlling relevant hardware, and the instructions may be stored in a computer-readable storage medium and loaded and executed by a processor.

Therefore, the embodiments of the present disclosure provide a computer readable storage medium which may include: a read only memory (ROM), a random access memory (RAM), a magnetic or optical disk, and the like. A computer program is stored on the computer readable storage medium, and is loaded by the processors to perform steps of any method for driving a spliced display provided in the embodiments of the present disclosure. For example, the computer program loaded by the processors may perform the following steps of:

acquiring an initial video image to be displayed; segmenting the initial video image into a first segmented image matched with a first sub-display screen and a second segmented image matched with a second sub-display screen; displaying the first segmented image on the first sub-display screen, and moving the second segmented image by preset bit pixels, so that a part of the image in the second segmented image is displayed on a position corresponding to a first filling screen.

In the foregoing embodiments, the description of each embodiment has respective focuses. For a part that is not described in detail in an embodiment, refer to a detailed description in the foregoing embodiments. Details are not described herein again.

During specific implementations, the foregoing units or structures may be implemented as independent entities, or may be randomly combined, or may be implemented as the same entity or several entities. For specific implementations of the foregoing units, refer to the foregoing method embodiments. Details are not described herein again.

For specific implementations of the above operations, refer to the foregoing embodiments. Details are not described herein again.

The method and apparatus for driving spliced display, server, and storage medium provided in the embodiments of the present disclosure are described above in detail. Although the principles and implementations of the present disclosure are described by using specific examples in this specification, the descriptions of the foregoing embodiments are merely intended to help understand the method and the core idea of the method of the present disclosure. Meanwhile, a person skilled in the art may make modifications to the specific implementations and application range according to the idea of the present disclosure. In conclusion, the content of this specification is not to be construed as a limitation to the present disclosure.

What is claimed is:

1. A method for driving a spliced display, wherein the spliced display comprises at least two sub-display screens, the at least two sub-display screens comprise a first sub-display screen and a second sub-display screen, and a first filling screen is arranged between the first sub-display screen and the second sub-display screen;

the method for driving a spliced display comprises following steps:

acquiring an initial video image to be displayed;

segmenting the initial video image into a first segmented image matched with the first sub-display screen and a second segmented image matched with the second sub-display screen; and displaying the first segmented image on the first sub-display screen, and moving the second segmented image as a whole by preset bit pixels, so that a part of the initial video image in the second segmented image is displayed on a position corresponding to the first filling screen, another part of the initial video image in the second segmented image is displayed in a first area of the second sub-display screen, and a second area of the second sub-display screen is a black area where no image is displayed.

2. The method for driving the spliced display as claimed in claim 1, wherein segmenting the initial video image into the first segmented image matched with the first sub-display screen and the second segmented image matched with the second sub-display screen comprises following steps:

determining a first size corresponding to the first sub-display screen and a second size corresponding to the second sub-display screen; and segmenting the initial video image according to the first size and the second size to obtain the first segmented image and the second segmented image.

3. The method for driving the spliced display as claimed in claim 1, wherein displaying the first segmented image on the first sub-display screen, and moving the second segmented image by preset bit pixels, so that a part of the image in the second segmented image is displayed on a position corresponding to the first filling screen, comprise following steps:

displaying the first segmented image on the first sub-display screen; and determining a size corresponding to the first filling screen so as to move the second segmented image by pixels corresponding to the size of the first filling screen, so that a part of the image in the second segmented image is displayed on the first filling screen.

4. The method for driving the spliced display as claimed in claim 1, wherein a number of the at least two sub-display screens is greater than two, the method further comprises a following step:

segmenting the initial video image into a plurality of different segmented images according to a size of the at least two sub-display screens.

5. The method for driving the spliced display as claimed in claim 4, wherein the spliced display further includes a third sub-display screen and a fourth sub-display screen, and the third sub-display screen and the fourth sub-display screen are arranged on a same side of the first sub-display screen; a second filling screen is arranged between the third sub-display screen and the fourth sub-display screen, a third filling screen is arranged between the first sub-display screen and the third sub-display screen, and a fourth filling screen is arranged between the second sub-display screen and the fourth sub-display screen;

segmenting the initial video image into the first segmented image matched with the first sub-display screen and the second segmented image matched with the second sub-display screen comprises following steps:

respectively determining a first size corresponding to the first sub-display screen, a second size corresponding to the second sub-display screen, a third size corresponding to the third sub-display screen and a fourth size corresponding to the fourth sub-display screen; and segmenting the initial video image according to the first size, the second size, the third size and the fourth size to obtain the first segmented image corresponding to the first sub-display screen, the second segmented image corresponding to the second sub-display screen, a third segmented image corresponding to the third sub-display screen and a fourth segmented image corresponding to the fourth sub-display screen.

6. The method for driving the spliced display as claimed in claim 5, wherein displaying the first segmented image on the first sub-display screen, and moving the second segmented image by preset bit pixels, so that a part of the image in the second segmented image is displayed on a position corresponding to the first filling screen, comprise following steps:

displaying the first segmented image on the first sub-display screen;

determining a size corresponding to the first filling screen so as to move the second segmented image by pixels corresponding to the size of the first filling screen, so that a part of the image in the second segmented image is displayed on the first filling screen; and determining a size corresponding to the second filling screen so as to move the third segmented image by pixels corresponding to a size of the third filling screen, so that a part of the image in the third segmented image is displayed on the third filling screen.

7. The method for driving a spliced display as claimed in claim 6, wherein displaying the first segmented image on the first sub-display screen, and moving the second segmented image by preset bit pixels, so that a part of the image in the second segmented image is displayed on a position corresponding to the first filling screen, comprise following steps:

determining a size corresponding to the fourth filling screen so as to move the fourth segmented image by pixels corresponding to the size of the fourth filling screen in a first direction, so that a part of the image in the fourth segmented image is displayed on the fourth filling screen; and moving the fourth segmented image by pixels corresponding to the size of the second filling screen in a second direction, so that a part of the image in the fourth segmented image is displayed on the second filling screen.

8. The method for driving the spliced display as claimed in claim 1, further comprising following steps:

determining the black area; and processing the initial video image to obtain a newly added video image corresponding to the black area so as to display the newly added video image in the black area.

9. The method for driving the spliced display as claimed in claim 7, wherein the first sub-display screen and the second sub-display screen are light-emitting diodes (LEDs) and the first filling screen, the second filling screen, the third filling screen, and the fourth filling screen are liquid crystal displays (LCDs).

10. An apparatus for driving a spliced display, wherein the spliced display comprises at least two sub-display screens, at least two sub-display screens comprise a first sub-display screen and a second sub-display screen, and a first filling screen is arranged between the first sub-display screen and the second sub-display screen;

the apparatus for driving the spliced display comprises:

an acquiring module, configured to acquire an initial video image to be displayed;

a segmenting module, configured to segment the initial video image into a first segmented image matched with the first sub-display screen and a second segmented image matched with the second sub-display screen; and a shifting module, configured to display the first segmented image on the first sub-display screen, and move the second segmented image as a whole by preset bit pixels, so that a part of the initial video image in the second segmented image is displayed on a position corresponding to the first filling screen, another part of the initial video image in the second segmented image is displayed in a first area of the second sub-display screen, and a second area of the second sub-display screen is a black area where no image is displayed.

11. The apparatus for driving the spliced display as claimed in claim 10, wherein the segmenting module is configured to determine a first size corresponding to the first sub-display screen and a second size corresponding to the second sub-display screen; and segment the initial video image according to the first size and the second size to obtain the first segmented image and the second segmented image.

12. The apparatus for driving the spliced display as claimed in claim 10, wherein the shifting module is configured to display the first segmented image on the first sub-display screen; and determine a size corresponding to the first filling screen so as to move the second segmented image by pixels corresponding to the size of the first filling screen, so that a part of the image in the second segmented image is displayed on the first filling screen.

13. The apparatus for driving the spliced display as claimed in claim 10, wherein a number of the at least two sub-display screens is greater than two, and the segmenting module is configured to segment the initial video image into a plurality of different segmented images according to a size of the at least two sub-display screens.

14. The apparatus for driving the spliced display as claimed in claim 10, wherein the spliced display further comprises a third sub-display screen and a fourth sub-display screen, and the third sub-display screen and the fourth sub-display screen are arranged on a same side of the first sub-display screen; a second filling screen is arranged between the third sub-display screen and the fourth sub-display screen, a third filling screen is arranged between the first sub-display screen and the third sub-display screen, and a fourth filling screen is arranged between the second sub-display screen and the fourth sub-display screen;

the segmenting module is configured to segment the initial video image into the first segmented image matched with the first sub-display screen and the second segmented image matched with the second sub-display screen, comprising following steps:

respectively determining a first size corresponding to the first sub-display screen, a second size corresponding to the second sub-display screen, a third size corresponding to the third sub-display screen and a fourth size corresponding to the fourth sub-display screen; and segmenting the initial video image according to the first size, the second size, the third size and the fourth size to obtain the first segmented image corresponding to the first sub-display screen, the second segmented image corresponding to the second sub-display screen, a third segmented image corresponding to the third sub-display screen and a fourth segmented image corresponding to the fourth sub-display screen.

15. The apparatus for driving the spliced display as claimed in claim 14, wherein the shifting module is configured to display the first segmented image on the first sub-display screen;

determine a size corresponding to the first filling screen so as to move the second segmented image by pixels corresponding to the size of the first filling screen, so that a part of the image in the second segmented image is displayed on the first filling screen; and determine a size corresponding to the second filling screen so as to move the third segmented image by pixels corresponding to a size of the third filling screen, so that a part of the image in the third segmented image is displayed on the third filling screen.

16. The apparatus for driving the spliced display as claimed in claim 15, wherein the shifting module is configured to determine a size corresponding to the fourth filling screen so as to move the fourth segmented image by pixels corresponding to the size of the fourth filling screen in a first direction, so that a part of the image in the fourth segmented image is displayed on the fourth filling screen; and move the fourth segmented image by pixels corresponding to the size of the second filling screen in a second direction, so that a part of the image in the fourth segmented image is displayed on the second filling screen.

17. The apparatus for driving the spliced display as claimed in claim 14, wherein the first sub-display screen and the second sub-display screen are light-emitting diodes (LEDs) and the first filling screen, the second filling screen, the third filling screen, and the fourth filling screen are liquid crystal displays (LCDs).

18. The apparatus for driving the spliced display as claimed in claim 10, wherein the at least two sub-display screens are of a same size.

19. A server, comprising:

one or more processors;

a memory; and one or more applications, wherein one or more applications are stored in the memory and configured to be executed by the processors to realize the method for driving the spliced display as claimed in claim 1.

20. A computer readable storage medium, wherein a computer program is stored on the computer readable storage medium, and is loaded by processors to perform steps of the method for driving the spliced display as claimed in claim 1.

* * * * *